G. M. BRISTLE.
BARK REMOVER.
APPLICATION FILED MAY 16, 1917.
1,261,689.
Patented Apr. 2, 1918.
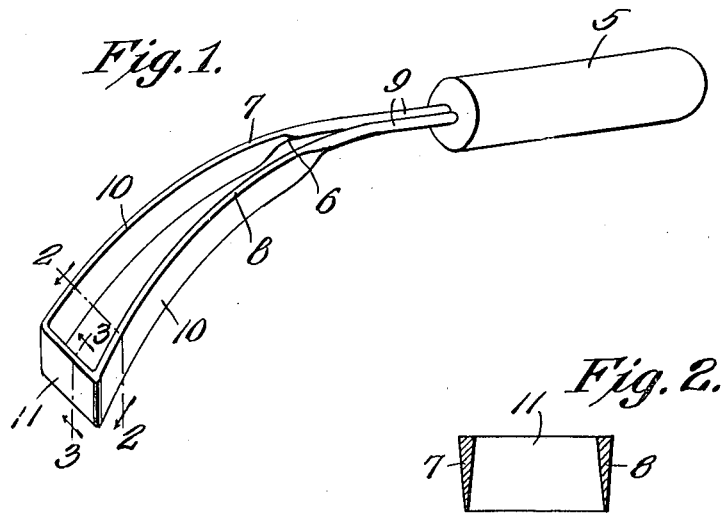
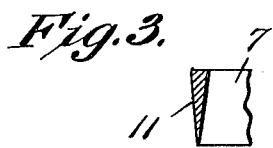
WITNESSES
James F. Crown,
Earle L. Keeler
INVENTOR
George M. Bristle,
BY Richard Owen,
ATTORNEY

UNITED STATES PATENT OFFICE.

GEORGE M. BRISTLE, OF ELLSWORTH, WISCONSIN.

BARK-REMOVER.

1,261,689.  Specification of Letters Patent.  Patented Apr. 2, 1918.

Application filed May 16, 1917. Serial No. 169,021.

*To all whom it may concern:*

Be it known that I, GEORGE M. BRISTLE, a citizen of the United States, residing at Ellsworth, in the county of Pierce and State of Wisconsin, have invented certain new and useful Improvements in Bark-Removers, of which the following is a specification.

This invention relates generally to lumbermen's tools and more particularly to bark removers, and has for its main object the provision of a means to remove or peel bark from either standing or felled trees with the least amount of labor.

Another object of the invention contemplates the provision of a device of the character described which is simple in construction, easy to manipulate, and inexpensive to manufacture, and which is particularly adapted for the work for which it is designed.

With these and other objects in view the invention consists in the construction, combination and arrangement of parts as will be hereinafter described and claimed.

Reference is to be had to the accompanying drawings forming part of this specification, in which similar reference characters indicate corresponding parts throughout the several views, and in which—

Figure 1 is a perspective view of the invention,

Fig. 2 is a sectional view on the line 2—2 of Fig. 1, and

Fig. 3 is a similar view on the line 3—3 of Fig. 1.

The device shown in the drawings comprises a handle 5, which may be constructed from any material and shaped in any manner, although a round wooden handle is preferable, and a peeling implement, designated 6 in its entirety, preferably constructed from a tempered metal, although it is to be understood that any other metal may be employed that will afford a hard sharp cutting edge. This implement is fixed to the handle in any approved fashion.

The part 6 is formed from a single piece of material having its terminals rounded and intermediate portion flattened, and is bent to provide two arms 7 and 8, which have their rounded ends 9 in close proximity to each other and by which it is secured to the handle, and flattened portions 10 separated by the part 11, leaving space between the arms for the bark to pass as it is being removed from the tree. The portions 10 of the arms and the part 11 are beveled to provide a cutting edge. In order that the greatest amount of cutting utility may be obtained, the arms are curved downwardly from the handle, which also permits the device to be used to the greatest advantage in stripping the bark circumferentially from the tree.

In operation the part 11 and adjacent portions of the arms 7 and 8 are forced through the bark, which will be found to be exceedingly easy because of the curvature of the arms, and then the part 11 is turned so it will be flat, or nearly so on the tree, loosening the bark sufficiently for its insertion thereunder. When this is done the bark is entirely removed from the tree by drawing the device along it, the part 11 loosening the bark from the tree and the sharpened edge 10 of the arms cutting it in strips, which pass up between the arms 7 and 8 where it can be easily grasped by the hand of the worker for removal.

The advantages resultant upon the use of my invention will be manifest to all who are conversant with the inconvenient and crude devices heretofore used in the art.

Such changes as are permissible by the subjoined claim may be resorted to without departing from the spirit of my invention.

Having fully described my invention what I claim as novel is:—

A bark remover comprising a handle, a blade formed of a single strip of metal and bent to form an intermediate transverse portion and a pair of longitudinal side portions converging into a point to be joined to said handle, said pair of blades being arcuated downwardly throughout their length toward the intermediate portion, and all of said portions being provided on their lower edges with cutting edges.

In testimony whereof I affix my signature in presence of two witnesses.

GEORGE M. BRISTLE.

Witnesses:
  CHAS. M. HANSEN,
  MABEL CHRISTENSON.